United States Patent
Falco (10) Patent No.: US 9,672,038 B2
(45) Date of Patent: Jun. 6, 2017

(54) SYSTEM AND METHOD FOR SUPPORTING A SCALABLE CONCURRENT QUEUE IN A DISTRIBUTED DATA GRID

(71) Applicant: Oracle International Corporation, Redwood Shores, CA (US)

(72) Inventor: Mark Falco, Burlington, MA (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 0 days.

(21) Appl. No.: 14/856,106

(22) Filed: Sep. 16, 2015

(65) Prior Publication Data

US 2016/0077867 A1    Mar. 17, 2016

Related U.S. Application Data

(60) Provisional application No. 62/051,008, filed on Sep. 16, 2014.

(51) Int. Cl.
*G06F 9/30* (2006.01)
*G06F 9/54* (2006.01)

(52) U.S. Cl.
CPC .......... *G06F 9/3009* (2013.01); *G06F 9/546* (2013.01); *G06F 2209/548* (2013.01)

(58) Field of Classification Search
None
See application file for complete search history.

(56) References Cited

U.S. PATENT DOCUMENTS

| | | | | |
|---|---|---|---|---|
| 8,458,721 | B2* | 6/2013 | Marathe | G06F 9/526 718/107 |
| 9,123,069 | B1* | 9/2015 | Haynes | G06Q 30/0625 |
| 2003/0216904 | A1* | 11/2003 | Knoll | G06F 17/271 704/9 |
| 2004/0054811 | A1* | 3/2004 | Hooper | H04L 49/9031 709/250 |
| 2011/0078652 | A1* | 3/2011 | Mani | G06F 8/10 717/105 |
| 2012/0054754 | A1* | 3/2012 | Teichmann | H04L 41/082 718/102 |
| 2013/0290656 | A1* | 10/2013 | Staelin | G06F 9/5083 711/158 |
| 2013/0290984 | A1* | 10/2013 | Denio | G06F 9/546 719/314 |

* cited by examiner

*Primary Examiner* — Emerson Puente
*Assistant Examiner* — Zhi Chen
(74) *Attorney, Agent, or Firm* — Tucker Ellis LLP (57) ABSTRACT

A scalable concurrent queue includes a central queue associated with multiple temporary queues for holding batches of nodes from multiple producers. When a producer thread or service performs an insertion operation on the scalable concurrent queue, the producer inserts one or more nodes into a batch in one of the multiple temporary queues associated with the central queue. Subsequently, the producer (or another producer) inserts the batch held in the temporary queue into the central queue. Contention between the multiple producers is reduced by providing multiple temporary queues into which the producers may insert nodes, and also by inserting nodes in the central queue in batches rather than one node at a time. The scalable concurrent queue scales to serve large number of producers with reduced contention thereby improving performance in a distributed data grid.

20 Claims, 6 Drawing Sheets

(PRIOR ART)

SYSTEM AND METHOD FOR SUPPORTING A SCALABLE CONCURRENT QUEUE IN A DISTRIBUTED DATA GRID

CLAIM OF PRIORITY

This application claims priority to U.S. Provisional Patent Application No. 62/051,008, entitled "SYSTEM AND METHOD FOR SUPPORTING A SCALABLE CONCURRENT QUEUE IN A DISTRIBUTED DATA GRID" filed Sep. 16, 2014 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems, and is particularly related to a distributed data grid.

SUMMARY

A distributed data grid may implement a multiple producer single consumer queue in situations where multiple services or threads are producing messages, tasks, or other data to a single for ordered consumption by a single service or thread. A conventional queue presents a bottleneck in such applications owing to contention between the services/threads attempting to insert messages, tasks, or other data into the tail of the conventional queue. It is therefore desirable to provide a scalable concurrent queue that overcomes the disadvantages of the conventional queue structure by, among other things, reducing and/or eliminating contention between the multiple producing threads or services thereby alleviating the bottleneck and improving performance of the distributed data grid. The scalable concurrent queue is also useful in other multi-threaded messaging systems.

Accordingly, in embodiments, the present disclosure describes systems and methods that can support a scalable concurrent queue suitable for concurrent use by a scalable and large number of producers with reduced contention. The scalable concurrent queue includes a central queue associated with multiple temporary queues for holding batches of nodes from multiple producers. When a producer thread or service performs an insertion operation on the scalable concurrent queue, the producer inserts one or more nodes into a batch in one of the multiple temporary queues associated with the central queue. Subsequently, the producer (or another producer) inserts the batch held in the temporary queue into the central queue. Contention between the multiple producers is reduced by providing multiple temporary queues into which the producers may insert nodes, and also be inserting nodes in the central queue in batches rather than one node at a time. The scalable concurrent queue scales to serve large number of producers with reduced contention thereby improving performance in a distributed data grid.

In a particular embodiment, the present disclosure describes a method for providing a scalable queue for holding in a multi-threaded processing environment. The method includes: providing a central queue having a head, a tail, a tail reference, and an ordered plurality of nodes; providing a plurality of temporary queues each holding a batch of nodes; and configuring a plurality of producers to perform an insertion operation to insert a node into said central queue. The producers are configured to perform an insertion operation by performing the following steps: inserting a node into a batch of nodes in a temporary queue of the plurality of temporary queues; attempting to insert said batch of nodes held in said temporary queue into the central queue; and completing said insertion operation when said batch is inserted into the central queue. The method enables nodes to be inserted into the central queue in batches, thereby reducing contention on said central queue.

These and other objects and advantages of the present invention will become apparent to those skilled in the art from the following description of the various embodiments, when read in light of the accompanying drawings.

DETAILED DESCRIPTION

Figure 1:
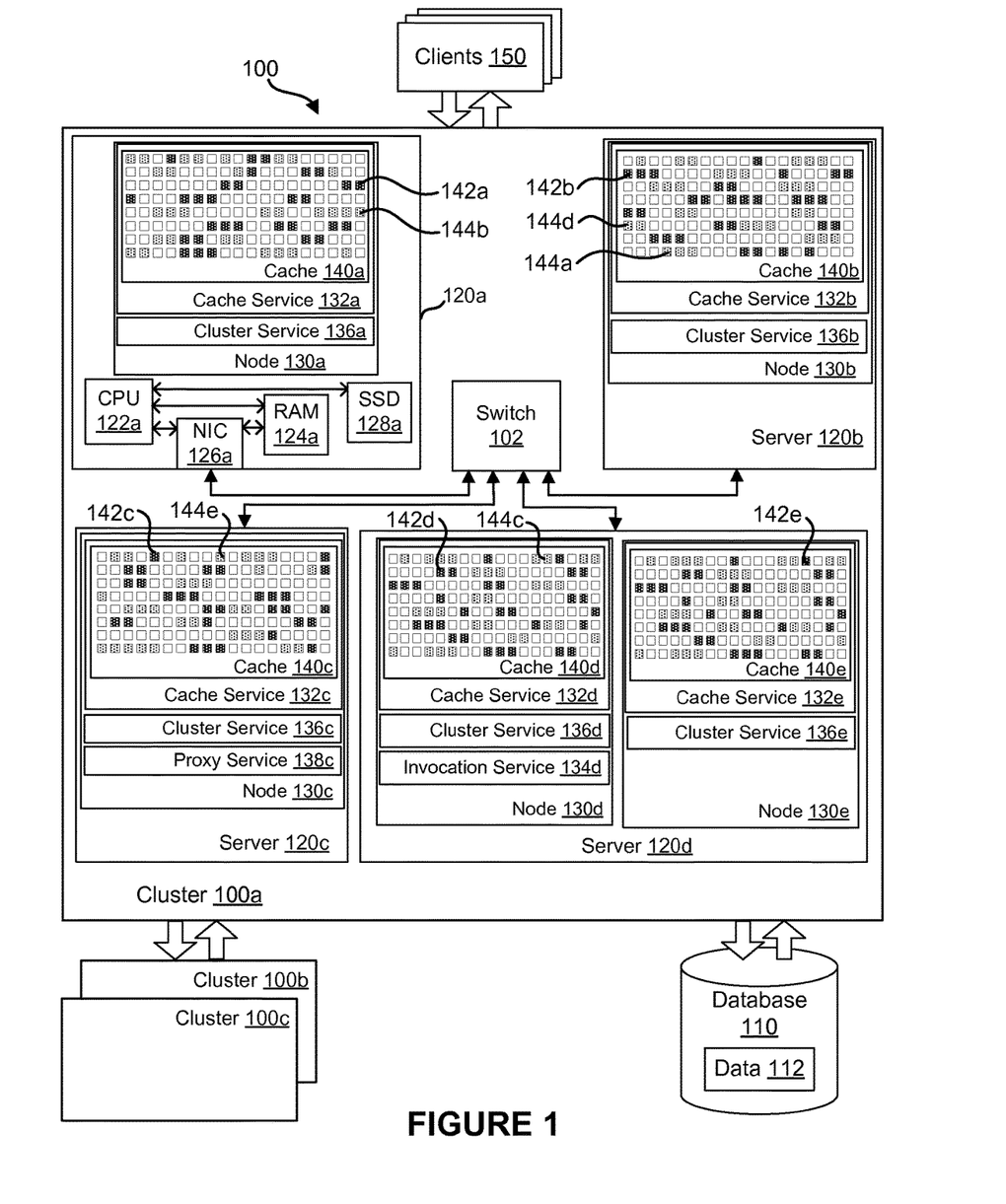
FIG. 1 illustrates a distributed data grid, in accordance with an embodiment of the invention.

Described herein are systems and methods that can support a scalable concurrent queue in a distributed data grid. In embodiments of the present invention, the distributed data grid described with respect to FIG. 1 is provided with improved performance by incorporating one or more scalable concurrent queue as described with respect to FIGS. 2B, 3A, and 3C. In an embodiment, each scalable concurrent queue includes a central queue associated with multiple temporary queues for holding batches of nodes from multiple producers. When a producer thread or service performs an insertion operation on the scalable concurrent queue, the producer inserts one or more nodes into a batch in one of the multiple temporary queues associated with the central queue. Subsequently, the producer (or another producer) inserts the batch held in the temporary queue into the central queue. Contention between the multiple producers is reduced by providing multiple temporary queues into which the producers may insert nodes, and also by inserting nodes in the central queue in batches rather than one node at a time. The scalable concurrent queue scales to serve large number of producers with reduced contention thereby improving performance in the distributed data grid. The scalable concurrent queue is also useful in a wide variety of other multithreaded messaging systems.

In the following description, the invention will be illustrated by way of example and not by way of limitation in the figures of the accompanying drawings. References to various embodiments in this disclosure are not necessarily to the same embodiment, and such references mean at least one. While specific implementations are discussed, it is understood that this is provided for illustrative purposes only. A person skilled in the relevant art will recognize that other components and configurations may be used without departing from the scope and spirit of the invention.

Furthermore, in certain instances, numerous specific details will be set forth to provide a thorough description of the invention. However, it will be apparent to those skilled in the art that the invention may be practiced without these specific details. In other instances, well-known features have not been described in as much detail so as not to obscure the invention.

The present invention is described with the aid of functional building blocks illustrating the performance of specified functions and relationships thereof. The boundaries of these functional building blocks have often been arbitrarily defined herein for the convenience of the description. Thus functions shown to be performed by the same elements may in alternative embodiments be performed by different elements. And functions shown to be performed in separate elements may instead be combined into one element. Alternate boundaries can be defined so long as the specified functions and relationships thereof are appropriately performed. Any such alternate boundaries are thus within the scope and spirit of the invention.

Common reference numerals are used to indicate like elements throughout the drawings and detailed description; therefore, reference numerals used in a figure may or may not be referenced in the detailed description specific to such figure if the element is described elsewhere. The first digit in a three digit reference numeral indicates the series of figures in which the element first appears.

Distributed Data Grid

A distributed data grid is a system in which a collection of computer servers work together in one or more clusters to manage information and related operations, such as computations, within a distributed or clustered environment. A distributed data grid can be used to manage application objects and data that are shared across the servers. A distributed data grid provides low response time, high throughput, predictable scalability, continuous availability and information reliability. As a result of these capabilities, a distributed data grid is well suited for use in computational intensive, stateful middle-tier applications. In particular examples, distributed data grids, such as e.g., the Oracle® Coherence data grid, store information in-memory to achieve higher performance, and employ redundancy in keeping copies of that information synchronized across multiple servers, thus ensuring resiliency of the system and continued availability of the data in the event of failure of a server.

In the following description, an Oracle® Coherence data grid having a partitioned cache is described. However, one of ordinary skill in the art will understand that the present invention, described for example in the summary above, can be applied to any distributed data grid known in the art without departing from the scope of the invention. Moreover, although numerous specific details of an Oracle® Coherence distributed data grid are described to provide a thorough description of the invention, it will be apparent to those skilled in the art that the invention may be practiced in a distributed data grid without these specific details. Thus, a particular implementation of a distributed data grid embodying the present invention can, in some embodiments, exclude certain features, and/or include different, or modified features than those of the distributed data grid described below, without departing from the scope of the invention.

FIG. 1 illustrates and example of a distributed data grid 100 which stores data and provides data access to clients 150. A "data grid cluster", or "distributed data grid", is a system comprising a plurality of computer servers (e.g., 120a, 120b, 120c, and 120d) which work together in one or more cluster (e.g., 100a, 100b, 100c) to store and manage information and related operations, such as computations, within a distributed or clustered environment. While distributed data grid 100 is illustrated as comprising four servers 120a, 120b, 120c, 120d, with five data nodes 130a, 130b, 130c, 130d, and 130e in a cluster 100a, the distributed data grid 100 may comprise any number of clusters and any number of servers and/or nodes in each cluster. The distributed data grid can store the information in-memory to achieve higher performance, and employ redundancy in keeping copies of that information synchronized across multiple servers, thus ensuring resiliency of the system and continued availability of the data in the event of server failure. In an embodiment, the distributed data grid 100 implements the present invention, described for example in the summary above and the detailed description below.

As illustrated in FIG. 1, a distributed data grid provides data storage and management capabilities by distributing data over a number of servers (e.g., 120a, 120b, 120c, and 120d) working together. Each server of the data grid cluster may be a conventional computer system such as, for example, a "commodity x86" server hardware platform with one to two processor sockets and two to four CPU cores per processor socket. Each server (e.g., 120a, 120b, 120c, and 120d) is configured with one or more CPU, Network Interface Card (NIC), and memory including, for example, a minimum of 4 GB of RAM up to 64 GB of RAM or more. Server 120a is illustrated as having CPU 122a, Memory 124a and NIC 126a (these elements are also present but not shown in the other Servers 120b, 120c, 120d). Optionally each server may also be provided with flash memory—e.g. SSD 128a—to provide spillover storage capacity. When provided the SSD capacity is preferably ten times the size of the RAM. The servers (e.g., 120a, 120b, 120c, 120d) in a data grid cluster 100a are connected using high bandwidth NICs (e.g., PCI-X or PCIe) to a high-performance network switch 120 (for example, gigabit Ethernet or better).

A cluster 100a preferably contains a minimum of four physical servers to avoid the possibility of data loss during a failure, but a typical installation has many more servers Failover and failback are more efficient the more servers that are present in each cluster and the impact of a server failure on a cluster is lessened. To minimize communication time between servers, each data grid cluster is ideally confined to a single switch 102 which provides single hop communication between servers. A cluster may thus be limited by the number of ports on the switch 102. A typical cluster will therefore include between 4 and 96 physical servers.

In most Wide Area Network (WAN) configurations of a distributed data grid 100, each data center in the WAN has independent, but interconnected, data grid clusters (e.g., 100a, 100b, and 100c). A WAN may, for example, include many more clusters than shown in FIG. 1. Additionally, by using interconnected but independent clusters (e.g., 100a, 100b, 100c) and/or locating interconnected, but independent, clusters in data centers that are remote from one another, the distributed data grid can secure data and service to clients 150 against simultaneous loss of all servers in one cluster caused by a natural disaster, fire, flooding, extended power loss and the like. Clusters maintained throughout the enterprise and across geographies constitute an automatic 'backup store' and high availability service for enterprise data.

One or more nodes (e.g., 130a, 130b, 130c, 130d and 130e) operate on each server (e.g., 120a, 120b, 120c, 120d) of a cluster 100a. In a distributed data grid the nodes may be for example, software applications, virtual machines, or the like and the servers may comprise an operating system, hypervisor or the like (not shown) on which the node operates. In an Oracle® Coherence data grid, each node is a Java virtual machine (JVM). A number of JVM/nodes may be provided on each server depending on the CPU processing power and memory available on the server. JVM/nodes may be added, started, stopped, and deleted as required by the distributed data grid. JVMs that run Oracle® Coherence automatically join and cluster when started. JVM/nodes that join a cluster are called cluster members or cluster nodes.

In an Oracle® Coherence data grid cluster members communicate using Tangosol Cluster Management Protocol (TCMP). TCMP is an IP-based protocol that is used to discover cluster members, manage the cluster, provision services, and transmit data between cluster members. The TCMP protocol provides fully reliable, in-order delivery of all messages. Since the underlying UDP/IP protocol does not provide for either reliable or in-order delivery, TCMP uses a queued, fully asynchronous ACK and NACK-based mechanism for reliable delivery of messages, with unique integral identity for guaranteed ordering of messages in queues associated with the JVMs operating on a server. The TCMP protocol requires only three UDP/IP sockets (one multicast, two unicast) and six threads per JVM/node, regardless of the cluster size.

The functionality of a data grid cluster is based on services provided by cluster nodes. Each service provided by a cluster node has a specific function. Each cluster node can participate in (be a member of) a number of cluster services, both in terms of providing and consuming the cluster services. Some cluster services are provided by all nodes in the cluster whereas other services are provided by only one or only some of the nodes in a cluster. Each service has a service name that uniquely identifies the service within the data grid cluster, and a service type, which defines what the service can do. There may be multiple named instances of each service type provided by nodes in the data grid cluster (other than the root cluster service). All services preferably provide failover and failback without any data loss.

Each service instance provided by a cluster node typically uses one service thread to provide the specific functionality of the service. For example, a distributed cache service provided by a node is provided by single service thread of the node. When the schema definition for the distributed cache is parsed in the JVM/node, a service thread is instantiated with the name specified in the schema. This service thread manages the data in the cache created using the schema definition. Some services optionally support a thread pool of worker threads that can be configured to provide the service thread with additional processing resources. The service thread cooperates with the worker threads in the thread pool to provide the specific functionality of the service.

In an Oracle® Coherence data grid, the cluster service (e.g., 136a, 136b, 136c, 136d, 136e) keeps track of the membership and services in the cluster. Each cluster node always has exactly one service of this type running. The cluster service is automatically started to enable a cluster node to join the cluster. The cluster service is responsible for the detection of other cluster nodes, for detecting the failure (death) of a cluster node, and for registering the availability of other services in the cluster. The proxy service (e.g., 138c) allows connections (e.g. using TCP) from clients that run outside the cluster. The invocation Service (e.g., 134d) allows application code to invoke agents to perform operations on any node in the cluster, or any group of nodes, or across the entire cluster. Although shown on only one node each, the invocation service and proxy service can be configured on any number up to all of the nodes of the distributed data grid.

In an Oracle® Coherence data grid, the distributed cache service (e.g., 132a, 132b, 132c, 132d, 132e) is the service which provides for data storage in the distributed data grid and is operative on all nodes of the cluster that read/write/store cache data, even if the node is storage disabled. The distributed cache service allows cluster nodes to distribute (partition) data across the cluster 100a so that each piece of data in the cache is managed primarily (held) by only one cluster node. The distributed cache service handles storage operation requests such as put, get, etc. The distributed cache service manages distributed caches (e.g., 140a, 140b, 140c, 140d, 140e) defined in a distributed schema definition and partitioned among the nodes of a cluster.

A partition is the basic unit of managed data in the distributed data grid and stored in the distributed caches (e.g., 140a, 140b, 140c, 140d, and 140e). The data is logically divided into primary partitions (e.g., 142a, 142b, 142c, 142d, and 142e), that are distributed across multiple cluster nodes such that exactly one node in the cluster is responsible for each piece of data in the cache. Each cache (e.g., 140a, 140b, 140c, 140d, and 140e) can hold a number of partitions. Each partition (e.g., 142a, 142b, 142c, 142d, 142e) may hold one datum or it may hold many. A partition can be migrated from the cache of one node to the cache of another node when necessary or desirable. For example, when nodes are added to the cluster, the partitions are migrated so that they are distributed among the available nodes including newly added nodes. In a non-replicated distributed data grid there is only one active copy of each partition (the primary partition). However, there is typically also one or more replica/backup copy of each partition (stored on a different server) which is used for failover. Because the data is spread out in partition distributed among the servers of the cluster, the responsibility for managing and providing access to the data is automatically load-balanced across the cluster.

The distributed cache service can be configured so that each piece of data is backed up by one or more other cluster nodes to support failover without any data loss. For example, as shown in FIG. 1, each partition is stored in a primary partition (e.g., dark shaded squares 142a, 142b, 142c, 142d, and 142e) and one or more synchronized backup copy of the partition (e.g., light shaded squares 144a, 144b, 144c, 144d, and 144e). The backup copy of each partition is stored on a separate server/node than the primary partition with which it is synchronized. Failover of a distributed cache service on a node involves promoting the backup copy of the partition to be the primary partition. When a server/node fails, all remaining cluster nodes determine what backup partitions they hold for primary partitions on failed node. The cluster nodes then promote the backup partitions to primary partitions on whatever cluster node they are held (new backup partitions are then created).

A distributed cache is a collection of data objects. Each data object/datum can be, for example, the equivalent of a row of a database table. Each datum is associated with a unique key which identifies the datum. Each partition (e.g., 142a, 142b, 142c, 142d, 142e) may hold one datum or it may hold many and the partitions are distributed among all the nodes of the cluster. In an Oracle® Coherence data grid each key and each datum is stored as a data object serialized in an efficient uncompressed binary encoding called Portable Object Format (POF).

In order to find a particular datum, each node has a map, for example a hash map, which maps keys to partitions. The map is known to all nodes in the cluster and is synchronized and updated across all nodes of the cluster. Each partition has a backing map which maps each key associated with the partition to the corresponding datum stored in the partition. An operation associated with a particular key/datum can be received from a client at any node in the distributed data grid. When the node receives the operation, the node can provide direct access to the value/object associated with the key, if the key is associated with a primary partition on the receiving node. If the key is not associated with a primary partition on the receiving node, the node can direct the operation directly to the node holding the primary partition associated with the key (in one hop). Thus, using the hash map and the partition maps, each node can provide direct or one-hop access to every datum corresponding to every key in the distributed cache.

In some applications, data in the distributed cache is initially populated from a database 110 comprising data 112. The data 112 in database 110 is serialized, partitioned and distributed among the nodes of the distributed data grid. Distributed data grid 100 stores data objects created from data 112 from database 110 in partitions in the memory of servers 120a, 120b, 120c, 120d such that clients 150 and/or applications in data grid 100 can access those data objects directly from memory. Reading from and writing to the data objects in the distributed data grid 100 is much faster and allows more simultaneous connections than could be achieved using the database 110 directly. In-memory replication of data and guaranteed data consistency make the distributed data grid suitable for managing transactions in memory until they are persisted to an external data source such as database 110 for archiving and reporting. If changes are made to the data objects in memory the changes are synchronized between primary and backup partitions and may subsequently be written back to database 110 using asynchronous writes (write behind) to avoid bottlenecks.

Although the data is spread out across cluster nodes, a client 150 can connect to any cluster node and retrieve any datum. This is called location transparency, which means that the developer does not have to code based on the topology of the cache. In some embodiments, a client might connect to a particular service e.g., a proxy service on a particular node. In other embodiments, a connection pool or load balancer may be used to direct a client to a particular node and ensure that client connections are distributed over some or all the data nodes. However connected, a receiving node in the distributed data grid receives tasks from a client 150, and each task is associated with a particular datum, and must therefore be handled by a particular node. Whichever node receives a task (e.g. a call directed to the cache service) for a particular datum identifies the partition in which the datum is stored and the node responsible for that partition, the receiving node, then directs the task to the node holding the requested partition for example by making a remote cache call. Since each piece of data is managed by only one cluster node, an access over the network is only a "single hop" operation. This type of access is extremely scalable, since it can use point-to-point communication and thus take optimal advantage of a switched fabric network such as InfiniBand.

Similarly, a cache update operation can use the same single-hop point-to-point approach with the data being sent both to the node with the primary partition and the node with the backup copy of the partition. Modifications to the cache are not considered complete until all backups have acknowledged receipt, which guarantees that data consistency is maintained, and that no data is lost if a cluster node were to unexpectedly fail during a write operation. The distributed cache service also allows certain cluster nodes to be configured to store data, and others to be configured to not store data.

In some embodiments, a distributed data grid is optionally configured with an elastic data feature which makes use of solid state devices (e.g. SSD 128a), most typically flash drives, to provide spillover capacity for a cache. Using the elastic data feature a cache is specified to use a backing map based on a RAM or DISK journal. Journals provide a mechanism for storing object state changes. Each datum/value is recorded with reference to a specific key and in-memory trees are used to store a pointer to the datum (a tiny datum/value may be stored directly in the tree). This allows some values (data) to be stored in solid state devices (e.g. SSD 128a) while having the index/memory tree stored in memory (e.g. RAM 124a). The elastic data feature allows the distributed data grid to support larger amounts of data per node with little loss in performance compared to completely RAM-based solutions.

A distributed data grid such as the Oracle® Coherence data grid described above can improve system performance by solving data operation latency problems and by caching and processing data in real time. Applications cache data in the data grid, avoiding expensive requests to back-end data sources. The shared data cache provides a single, consistent view of cached data. Reading from the cache is faster than querying back-end data sources and scales naturally with the application tier. In memory performance alleviates bottlenecks and reduces data contention, improving application responsiveness. Parallel query and computation is supported to improve performance for data-based calculations. The distributed data grid is fault-tolerant, providing for data reliability, accuracy, consistency, high availability, and disaster recovery. The distributed data grid enables applications to scale linearly and dynamically for predictable cost and improved resource utilization. For many applications, a distributed data grid offers a valuable shared data source solution.

Figure 2A:
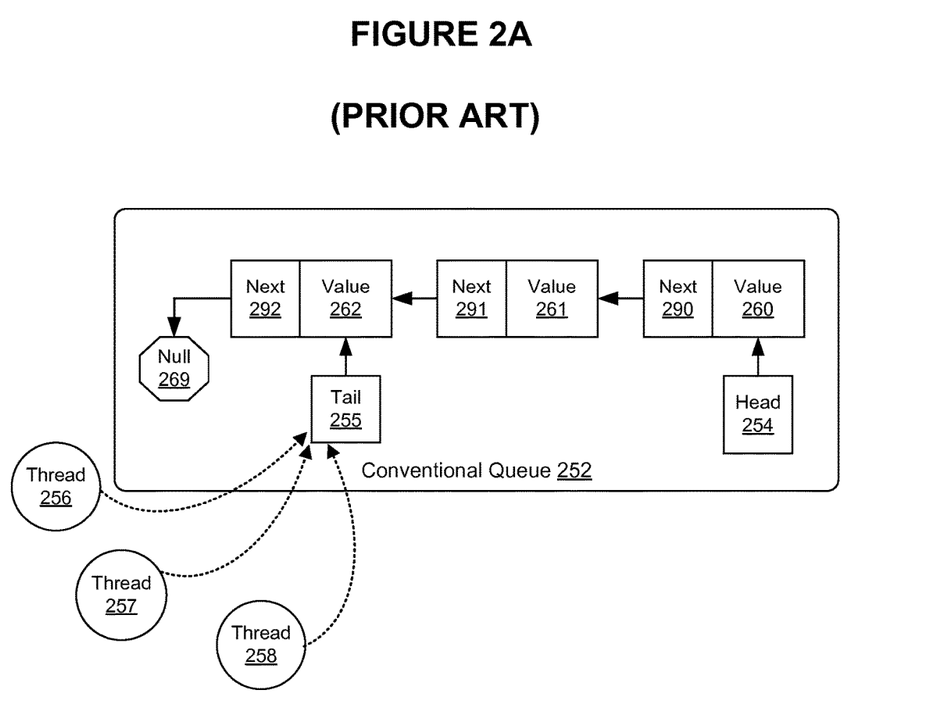
FIG. 2A illustrates a conventional queue.
Figure 2B:
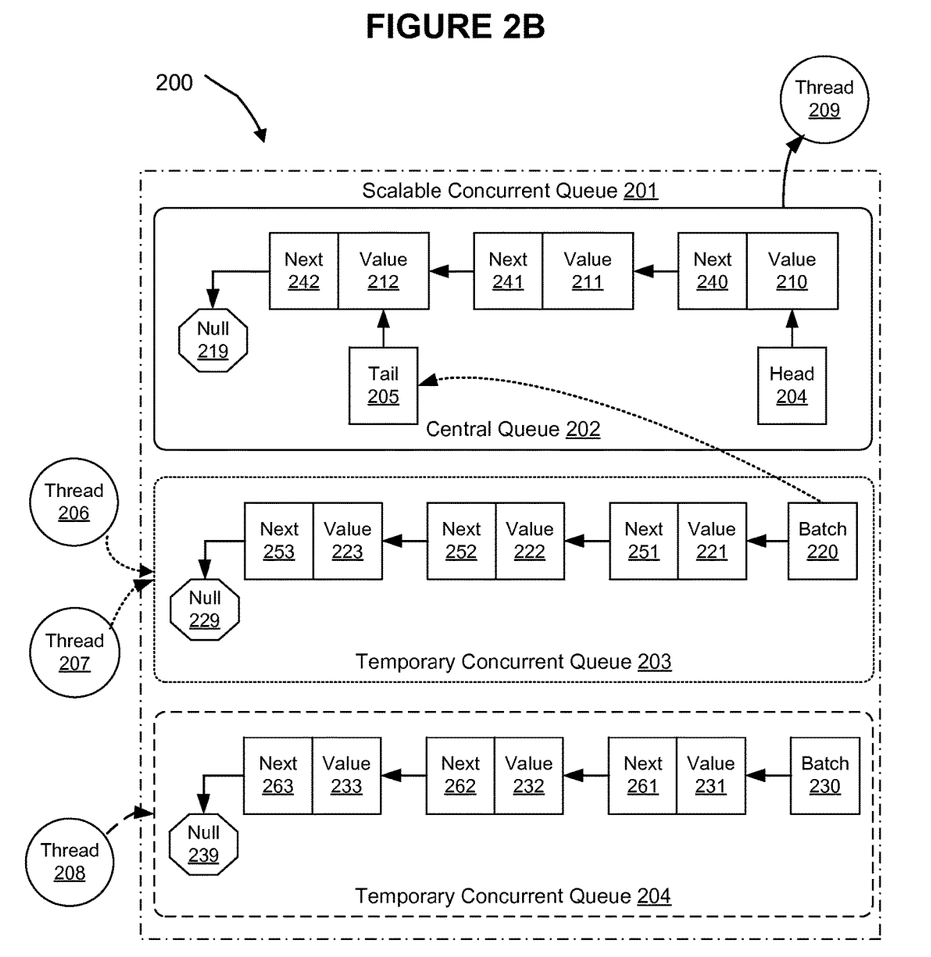
FIG. 2B illustrates a system and method for supporting a scalable concurrent queue, in accordance with an embodiment of the invention.
Figure 3A:
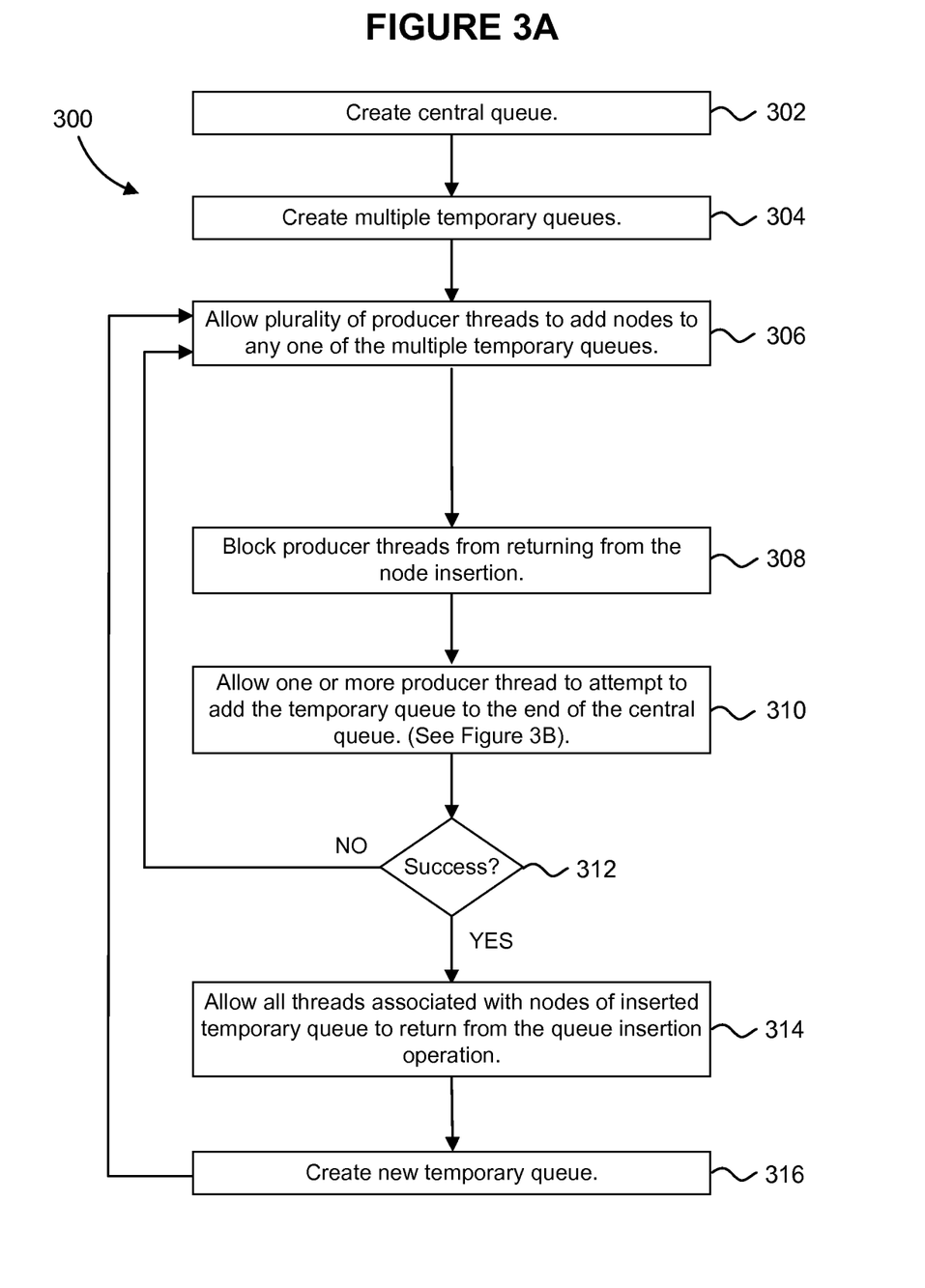
FIGS. 3A and 3B illustrate methods for supporting a scalable concurrent queue, in accordance with an embodiment of the invention.
Figure 3B:
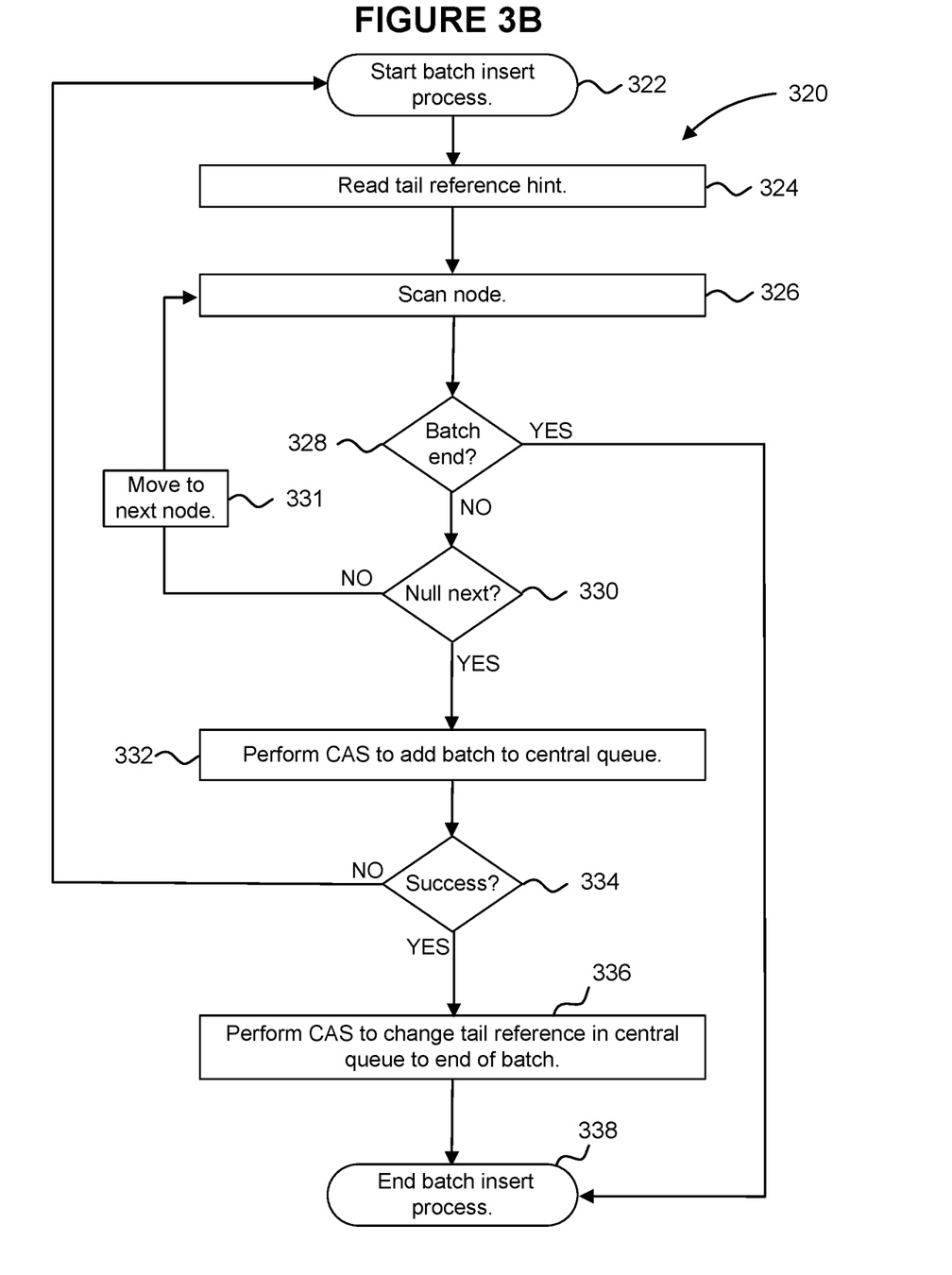

In embodiments of the present invention, the distributed data grid described with respect to FIG. 1 is provided with improved performance by incorporating one or more scalable concurrent queue as described with respect to FIGS. 2B, 3A, and 3B. The scalable concurrent queue can be implemented, in part in the memory (e.g. RAM 124a) utilized by each node of the distributed data grid 100 of FIG. 1.

Queues In A Distributed Data Grid

As described above, a distributed data grid is a collection of computer servers which work together in one or more clusters to manage information and related operations, such as computations, within a distributed or clustered environment. Each computer server may include many virtual machine nodes, each node providing services to the cluster. Each service (e.g. cache service 132a of FIG. 1) on each node typically uses one service thread to provide the specific functionality of the service. The service threads communicate with other services and threads in the cluster or on the nodes as well as worker threads on the node.

A distributed data grid, as described above, is configured to process very large numbers of short tasks received from clients or other nodes. For example, the service thread of a distributed cache service (e.g. Cache Service 132a of FIG. 1) is configured to process very large numbers of storage operation requests such as put, get, etc. received from applications or other nodes in the distributed data grid. The processing of each storage operation is short-lived, however, the number of storage operations is very large.

As described in the description of a distributed data grid above, services provided by a node of a distributed data grid typically use one service thread to provide the specific functionality of the service. Each service thread operates in a node configured on a server which, as described above, preferably comprises a multi-core processor. A multi-core processor is capable of processing many threads in parallel and/or simultaneously. Thus, in order to efficiently process the very large number of short-lived operations, a service thread such as the service thread for the Distributed Cache Service (e.g. Cache Service 132a of FIG. 1) utilizes a pool of worker threads to provide the service thread with additional processing resources.

Communication between threads whether on the same node or different nodes may be mediated using queues. A queue is an abstract data type or collection in which the entities in the collection are kept in order and the principal operations on the collection are the addition of entities to the rear terminal position, known as enqueue, and removal of entities from the front terminal position, known as dequeue. This makes the queue a First-In-First-Out (FIFO) data structure in which the first element added to the queue will be the first one to be removed. For example, in an environment where a service thread of the distributed data grid utilizes a pool of worker threads, when the worker threads are finished with tasks offloaded from the service thread they provide responses back to the service thread. There may be a large number of worker threads and a single service thread, thus communication between the worker threads and service thread can be achieved with a multiple producer single consumer queue. The worker threads are the multiple producers and the service thread is the single consumer. There are also many other processes in the distributed data where multiple threads/services send messages to a queue to be consumed by a single consumer thread/service.

However, where very many worker threads are in use, the multiple producer single consumer queue becomes source of contention especially in a distributed data grid where a very large number of short-lived transactions are being processed by the worker threads. In a conventional queue, only one thread can write to the queue at a time. Other threads must wait for their turn to access the queue. If the threads have to wait for the queue, they cannot be working performing additional tasks. Ultimately, the shared resource of the queue is so constrained that that the worker threads can only proceed one at a time—a problem called serialization. This is a disadvantage because it negates the purpose of multiple threads—namely having multiple threads operating in parallel.

Disadvantages of Conventional Queue

FIG. 2A illustrates a conventional concurrent queue implementation. FIG. 2A depicts a queue which is represented as a linked list where each node in the list contains a value and a next reference. As shown in FIG. 2A the conventional queue 252 includes a linked list of nodes, each of which can have a value and a reference that points to the next node in the linked list. For example, the first node can have a value 260 and a next reference 290 that points to the second node in the linked list. As shown in FIG. 2A, the second node can have a value 261 and a next reference 291 that points to the third node in the linked list. The third node can have a value 262 and a next reference 292, which has a null value 269. Additionally, the conventional queue 252 can include a head reference 254, which points to the first node in the linked list, and a tail reference 255, which points to the last node in the linked list.

As shown in FIG. 2A, a thread (e.g. threads 256, 257, 258) attempting to insert an element into the conventional queue 252 will utilize a compare-and-set (CAS) operation on the queue's tail 255 to insert an element into the queue. A compare-and-set is an atomic instruction used in multi-threading to achieve synchronization. It compares the contents of a memory location to a given value and, only if they are the same, modifies the contents of that memory location to a given new value. This is done as a single atomic operation. The atomicity guarantees that the new value is calculated based on up-to-date information; if the value had been updated by another thread in the meantime, the write would fail. Thus only one thread can CAS a memory location at a time. The result of the CAS operation indicates whether it performed the substitution with a simple Boolean response. Insertion into the conventional queue consists of CASing the tail reference 255—i.e. modifying the tail reference such that it points to the new tail after insertion.

The problem with this approach is that the conventional queue 352 has a single partition (the tail) shared by all of the producing threads. The tail represents a bottleneck. As the number of threads competing to CAS the tail increases, the likelihood that each thread's attempt to perform a CAS operation will fail also increases because it is more likely that another thread will already be performing a CAS operation. This effectively increases the time it takes for a thread to access the tail because the CAS operation may fail one or more times. When CAS operations are being performed on the tail at the maximum rate, adding new worker threads will not improve throughput because the threads will just have to make more attempts to CAS tail before succeeding. Indeed throughput may decrease because of the overhead of failed CAS attempts and overhead related to idling and waking threads between CAS attempts. Thus, the conventional queue of FIG. 2A, cannot scale beyond the limits of the contention on the tail which all the producers i.e. threads 256, 257 and 258 must access one at a time.

Scalable Concurrent Queue

Thus, it is desirable to provide a scalable concurrent queue which can provide reduced contention when serving a large number of producing threads attempting to write to the queue. It is desirable to produce a concurrent queue implementation which can scale to effectively handle many threads concurrently inserting into it with reduced contention. Such a scalable concurrent queue can be applied, for example, to enhance operation of a service thread configured with a pool of worker threads in a distributed data grid. Such a scalable concurrent queue can also be applied to a wide variety of other applications having multiple producers writing to a single queue. For example, the scalable concurrent queue is also useful in other systems utilizing a multi-threaded messaging system.

Providing a scalable concurrent queue is difficult because, by definition, a queue is an ordered data structure. In general terms, to make something scale while being modified it must be able to be partitioned in some way to allow the contention to be spread across independent partitions. However if the partitions are independent, they do not inherently maintain the required order of the data structure. Thus, simply increasing the number of conventional queues is not a solution.

Accordingly, the present disclosure describes systems and methods that can support a scalable concurrent queue suitable for use in a distributed data grid. The queue can scale, depending on demand, to serve small numbers of producing threads up to large numbers of producing threads concurrently. As such the scalable concurrent supports the use of scalable thread pools of worker threads (multiple producers) which provide a service thread (single consumer) with additional processing resources. In particular, the present disclosure describes a multiple producer single consumer dynamically scalable concurrent queue structure that exhibits high performance on multi-core systems when concurrently serving many producing threads thereby improving performance of service execution in a distributed data grid. The scalable concurrent queue can be implemented, in part in the memory (e.g. RAM 124a) utilized by each node of the distributed data grid 100 of FIG. 1. In an embodiment, the distributed data grid of FIG. 1, supports a scalable concurrent queue that is optimized to reduce memory contention.

In particular, the present disclosure describes systems and methods that can support a scalable concurrent queue suitable for use in a distributed data grid. The queue can scale depending on demand to serve small numbers of producing threads up to large numbers of producing threads concurrently. The scalable concurrent queue respects insertion order yet internally scales via partitioning. In order to maintain insertion order, entries are still moved through a single tail partition, but the partition structure allows the queue to scale as if they were not. Scalability is achieved, in part by inserting batches containing large number of entries through the tail. Multiple batches are allowed to be prepared concurrently. Each batch effectively becomes a temporary concurrent queue unto itself and is not effected by contention on other batches. Each batch insert into the central queue then consists of a single CAS operation which is far more effective than CAS of a single element in the conventional queue of FIG. 2A. Additionally, to combat slow producer issues, the CAS operation for inserting a batch is performed on a next value reference rather than the tail reference of the queue according to batch insertion logic described below.

FIG. 2B shows an illustration of a system and method for supporting a scalable concurrent queue in a distributed data grid, in accordance with one embodiment of the invention. As shown in FIG. 2B, a scalable concurrent queue 201 in the distributed data grid 200 includes a central queue 202 and one or more batches of nodes, e.g. the batches 220 and 230. Each batch resembles a temporary concurrent queue.

The central queue 202 includes a linked list of nodes, each of which has a value and a reference that points to the next node in the linked list. For example, the first node has a value 210 and a next reference 240 that points to the second node in the linked list. The second node has a value 211 and a next reference 241 that points to the third node in the linked list. The third node has a value 212 and a next reference 242, which has a null value 219. Additionally, the central queue 202 has a head reference 204, which points to the first node in the linked list, and a tail reference 205, which points to the last node in the linked list. Each value can be, for example, a message, a packet, an instruction, and/or a serialized data object. Each next reference can be for example a memory address or relative memory address for the location of the next node.

As shown in FIG. 2B, the temporary concurrent queue 203 includes a batch reference 220, which points to a node with a value 221 and a next reference 251. The next reference 251 points to a node with a value 222 and a next reference 252. The next reference 252 points to a node with a value 223 and a next reference 253 with a null value 229. Also, the temporary concurrent queue 204 includes a batch reference 230, which points to a node with a value 231 and a next reference 261. The next reference 261 points to a node with a value 232 and a next reference 262. The next reference 262 points to a node with a value 233 and a next reference 263 with a null value 239. The number of nodes in each temporary concurrent queue is not fixed or limited but will increase as nodes are added to the temporary concurrent queue until the batch of nodes is inserted in the central queue 202. The scalable concurrent queue 201 may also include additional temporary concurrent queues (not shown).

In accordance with an embodiment of the invention, when a thread (e.g. a thread 206-208) performs an insertion operation on the scalable concurrent queue 201, the system allows the thread to insert one or more nodes into a random batch that is associated with the central queue 202. That is, threads performing an insertion operation are directed to perform the insertion operation on a randomly selected one of the temporary concurrent queues 203, 204 rather than directly on the central queue 202. For example, as shown in FIG. 2B, both the threads 206-207 insert one or more nodes into the temporary concurrent queue 203 (i.e. the batch 220), while the thread 208 inserts one or more nodes into the temporary concurrent queue 204 (i.e. the batch 230). Alternatively threads may be directed to perform insertion options over a plurality of temporary concurrent queues in a round robin fashion to distributed nodes over the temporary concurrent queues.

Each of the temporary concurrent queues 203, 204 thus holds a batch of yet to be inserted nodes in that these nodes have not yet been inserted in central queue 202. Prior to insertion in central queue 202, there is not yet any "insertion order" for items within different batches or even within the same batch. Because the batches represent yet to be inserted nodes the inserting thread cannot return from the insertion operation until the batch (including the node the thread is attempting to insert) has been fully inserted into the central queue 202. To put it another way the enqueue operation of a thread is not complete when the thread inserts a node into the temporary queue. Hence the thread is held until the nodes of the temporary queue are inserted (batchwise) into the central queue 202, at which point the enqueue operation is complete and the thread is released to return from the enqueue operation.

After inserting one or more nodes in to the batch 220, the thread 206 may attempt to insert the batch 220 into the central queue 202. Furthermore, the thread 206 is allowed to complete the insertion operation (e.g. to return from the insertion operation), only after the batch 220 is inserted into the central queue 202 either by the thread 206 or by a concurrent thread 207. Scalability is achieved by spreading the per node CAS cost across the batches and minimizing the per node CAS cost on the central queue 202.

To put it another way contention is reduced because there are multiple temporary concurrent queues into which producer threads can insert nodes instead of just a single tail in the conventional queue. Additionally, instead of placing nodes into the central queue—one-at-a-time—as in the conventional queue they are added in batches containing multiple nodes at one with one CAS operation thereby reducing the number of CAS operations that must be performed to insert nodes into the central queue 202.

Removal of nodes from this queue is not complicated by the presence of the partitioning and batch adding and can use a typical concurrent queue removal CAS loop. In a typical configuration a single consumer thread 209 performs the concurrent queue removal CAS loop at the head of the central queue 202 to remove values sequentially from the central queue 202. Removal of nodes from the head of the queue is performed independently of, and concurrently with, addition of batches to the tail of the queue. Removal of nodes may thus be performed in a conventional manner.

In a preferred embodiment, batch removal of nodes from the head of the queue is not used. A primary advantage of the scalable concurrent queue is to permit efficient/reduced contention insertion of nodes by into the tails of the central queue 252. In most cases a queue is only used when there is a single consumer because having multiple consumers naturally invalidates insertion order and makes the choice of a queue as a data structure unusual. It is thus unusual to use a queue data structure to feed multiple consuming threads. Hence the scalable concurrent queue disclosed herein is designed to address the needs of the predominant situation with multiple producers and a single consumer.

The number of nodes in each temporary concurrent queue is not limited by a maximum imposed by the system. The number of nodes in each queue will increase as threads insert nodes into each temporary concurrent queue. However the thread which inserts the first node into each batch (primary thread) and periodically other threads (secondary threads) will attempt to insert the batch into the central queue 202 as quickly as possible. The secondary threads implement a delay which is imposed by iterating through the entire contents of the batch in which the secondary thread is held. Thus, as the batch size increases the delay between batch insertion attempts increases for all secondary threads. The number of nodes in the temporary concurrent queue will continue to grow until it is successfully inserted into the central queue 202. When the temporary concurrent queue is successfully inserted into the central queue 202, a new temporary concurrent queue is created and threads can begin adding nodes to the new temporary concurrent queue.

Two temporarily concurrent queues are shown in FIG. 2B, however the system can be configured to provide a greater number of temporary concurrent queues existing at the same time. In an embodiment, the number of temporary concurrent queues included in a scalable concurrent queue is fixed based a fraction of the number of CPU cores available on the hosting machine. Because each inserting thread is held, it is assumed the maximum number of concurrently inserting threads will be relative to the CPU count. Also, it is desirable to allow the batches to grow to contain a significant number of nodes to improve efficiency. The larger the size of the batches of nodes inserted into the central queue 252, the less contention there is on the central queue 202. For example a scalable concurrent queue 201 can be configured with between two and eight temporary concurrent queues if the hosting machine has 8 CPU cores. However, in alternative embodiments the number of temporary concurrent queues need not be limited by the number of CPU cores and/or can be a variable number based, for example, on workload.

The batch insertion logic of the scalable concurrent queue addresses issues which may arise when inserting a batch in the central queue 202. If the insertion is performed in the conventional manner by CAS on the tail reference (See FIG. 2A), the update to value 212's next reference 242 cannot occur until the tail reference has been updated (CAS). If the producer thread is swapped off the CPU before the CAS operation is complete, then the new values added in the batch will not be visible to a consumer until the slow-producer gets more CPU time and completes the insertion CAS operation on the tail reference. This "slow producer" issue can be addressed by performing the CAS directly on the next reference and simply treating the tail reference 205 as a hint (i.e. it is not a definitive reference because it may not yet have been updated by the "slow producer" to show the real tail. This means that that each inserting thread will need to find the true tail by reading the tail reference and then following the next references down the central queue until the inserting thread encounters a null next, which is the true tail. The inserting thread then performs the CAS operation on this null next which is the true tail (modifying the null next to refer to the first node in the inserted batch).

Thus, in the above implementation each insertion of a batch of nodes into the central queue 202 is achieved by walking the batch linked list. The thread which inserts at the head of each batch (primary thread) in temporary concurrent queues 203, 204 takes the primary responsibility for attempting to insert the batch of nodes in the temporary queue into the central queue 202 while all the other threads (secondary threads) in the batch only periodically attempt insertion of the batch into the central queue 202. As described above, the secondary threads implement a delay between batch insertion attempts and the delay increases with batch size. By avoiding having all threads in each batch attempting to CAS the batch into the queue the CAS contention on the central queue is reduced. The reason other threads held in the temporary queue do periodically attempt the insertion is to protect against the possibility that the primary thread has been swapped off the CPU. The periodic attempts by other threads in the batch to insert the batch provides protection against lock-like behavior which might result if all threads waited for the primary thread to complete the work.

The thread which inserts at the head of each batch (primary thread) in temporary concurrent queues 203, 204 takes the primary responsibility for attempting to insert the batch into the central queue 202 but other threads in the batch (secondary threads) also periodically attempt insertion of the batch into the central queue 202. Thus in some cases two or more threads may attempt to insert the same batch of nodes into the central queue. After a first inserting thread selects the current tail of the central queue 202 on which to perform a CAS operation to insert the batch, if a second thread succeeds in adding the batch before the first thread performs the CAS operation, the CAS operation attempted by the first thread CAS will fail because the tail will have a non-null next reference. However, if the second thread inserts the batch before the first thread has found/reached the tail, the first thread may continue walking the central queue and then insert a duplicate copy of the batch when it arrives at a null value. This would result in a duplicate copy of the batch of nodes being inserted into the central queue.

If the same batch is inserted twice into the central queue it could corrupt the queue by producing a produce a cycle of references within the linked list of the central queue. Thus, an additional mechanism is provided to ensure that, if two or more threads attempt to insert the same batch of nodes into the central queue 202, only one of those attempts is successful. Accordingly scalable concurrent queue 201 is provided with a batch insertion logic which ensures that only one thread associated with a temporary concurrent queue can succeed in inserting the batch of nodes in the temporary concurrent queue into the central queue. In principle, a mechanism could be devised such that only one thread associated with a batch could attempt to insert the batch at a time however any such mechanism would be prone to locking. The batch insertion logic of the scalable concurrent queue 201 prevents duplicate insertion of a batch into central queue 202 in a lock-free manner.

To prevent duplicate insertion in a lock-free manner, the each thread attempting to insert a batch of nodes into the central queue scans nodes of the central queue for both the tail (null) of the central queue and the batch end of the batch being inserted. If the batch is added by the second thread before the first thread finds the tail (null) of the central queue then the central queue will contain the batch end of the batch being inserted or some node of the batch could appear to have been removed. If the scan of the central queue 202 by the first thread does not find either a remove or the batch end of the batch being inserted when scanning the central queue 202, it can be certain that the batch it is attempting to insert has not already been inserted by the second thread. Thus, by scanning the central queue for both the tail (null) of the central queue 202 and the batch end of the batch being inserted the first thread can ensure that it is safe to insert the batch (i.e. that no other thread has already inserted the same batch). While it may seem expensive to scan for both the tail and the batch end, each insertion iteration starts its scan where the former iteration left off i.e. the number of nodes to be scanned includes at most the nodes which have been concurrently added to the batch during the last insertion iteration.

FIG. 3A illustrates a method 300 for creating a scalable concurrent queue. As shown in FIG. 3A, a central queue is created at step 302 and multiple temporary queues are created at step 304. At step 306 multiple producer threads are directed to add nodes to the temporary queues by, e.g. performing a CAS operation adding a node at an end of the temporary queue. At step 308 threads which insert nodes into the temporary queues are not permitted to return from the enqueue operation until the batch of nodes in the temporary queue is batch inserted to the central queue (the enqueue operation is not yet complete and thus the threads are held/blocked). Many threads may be performing steps 306 and 308 at any point in time (i.e. inserting nodes into one of the temporary queues and becoming held).

At step 310 the thread which inserted the node at the head of each temporary queue (primary thread) (or periodically another thread) attempts to insert the batch of nodes into the central queue (see method of FIG. 3B). The primary thread keeps making attempts to insert the batch until it succeeds (or another thread succeeds). If the batch of nodes is not successfully added to the central queue at step 312 then threads keep adding more nodes to the temporary queue at step 306 and become held at step 308. Also the primary thread (and periodically another thread) keeps trying to insert the batch of nodes from the temporary queue into the central queue step 310. The threads other than the primary thread make periodic attempts to insert the batch and implement a delay (which increases with batch size) between batch insertion attempts to reduce contention on the central queue.

When at step 312, the primary thread successfully inserts the batch of nodes from the temporary queue into the central queue, the method proceeds to step 314 where all the threads which inserted nodes into the temporary queue before successful insertion to the central queue are released because the enqueue operation is now complete. At step 316 a new temporary queue is created to replace the temporary queue which has just been appended to the central queue. The new temporary queue is added to the multiple temporary queues and threads can beginning adding nodes to the new temporary queue step 306, and becoming held step 308. The cycle continues with multiple temporary queues growing in parallel as nodes are added to them and then subsequently being appended to the central queue.

FIG. 3B illustrates a method 322 for inserting a batch of nodes from a temporary queue into the central queue (i.e. appending the nodes to the central queue). This method is performed repeatedly by the thread which inserted the node at the head of each temporary queue (primary thread). This method is also performed periodically by other threads associated with nodes inserted in the temporary queue. The threads other than the primary thread make periodic attempts to insert the batch and implement a delay (which increases with batch size) between batch insertion attempts to reduce contention on the central queue. Thus, the primary thread and periodically other threads repeat this method until the batch of nodes is successfully added/appended to the central queue. The method starts at step 322. At step 322 the thread reads the tail reference from the central queue as a hint to where the end of the central queue is located. At step 326 the thread looks at the node indicated. At step 328 the thread determines whether the node is the batch end of the batch that the thread is trying to insert. If it finds the batch end, then the batch has already been inserted and the thread can end the batch insertion method at step 338.

At step 330 the thread examine the node to determine if it has a null next field. If the next field is not null, the thread has not yet reached the end of the central queue. In which case, the thread follows the next indication and moves to the identified next node at step 331. The thread then goes back to step 326 and repeats the analysis of the next node. Steps 326, 328, 330, 331 repeat until either the batch end is found (terminating the process) or the thread succeeds in finding a null next.

If the thread is successful in finding a null next at step 330 it attempts to perform a CAS operation step 332 on the null next in order to append the batch of nodes to the central queue. This CAS operation may not be successful—if it fails at step 334—the thread (or another thread) repeats the batch insertion process from the start at step 322. If the CAS operation on the null next is successful, the batch has been successfully appended by the thread. Thus, at step 336 the thread performs a CAS operation on the tail reference of the central queue such that it points to the end node of the batch successfully inserted. The thread then ends the batch insertion process step 328 and can return from the enqueue operation (along with all the other threads associated with the temporary queue).

Figure 4:
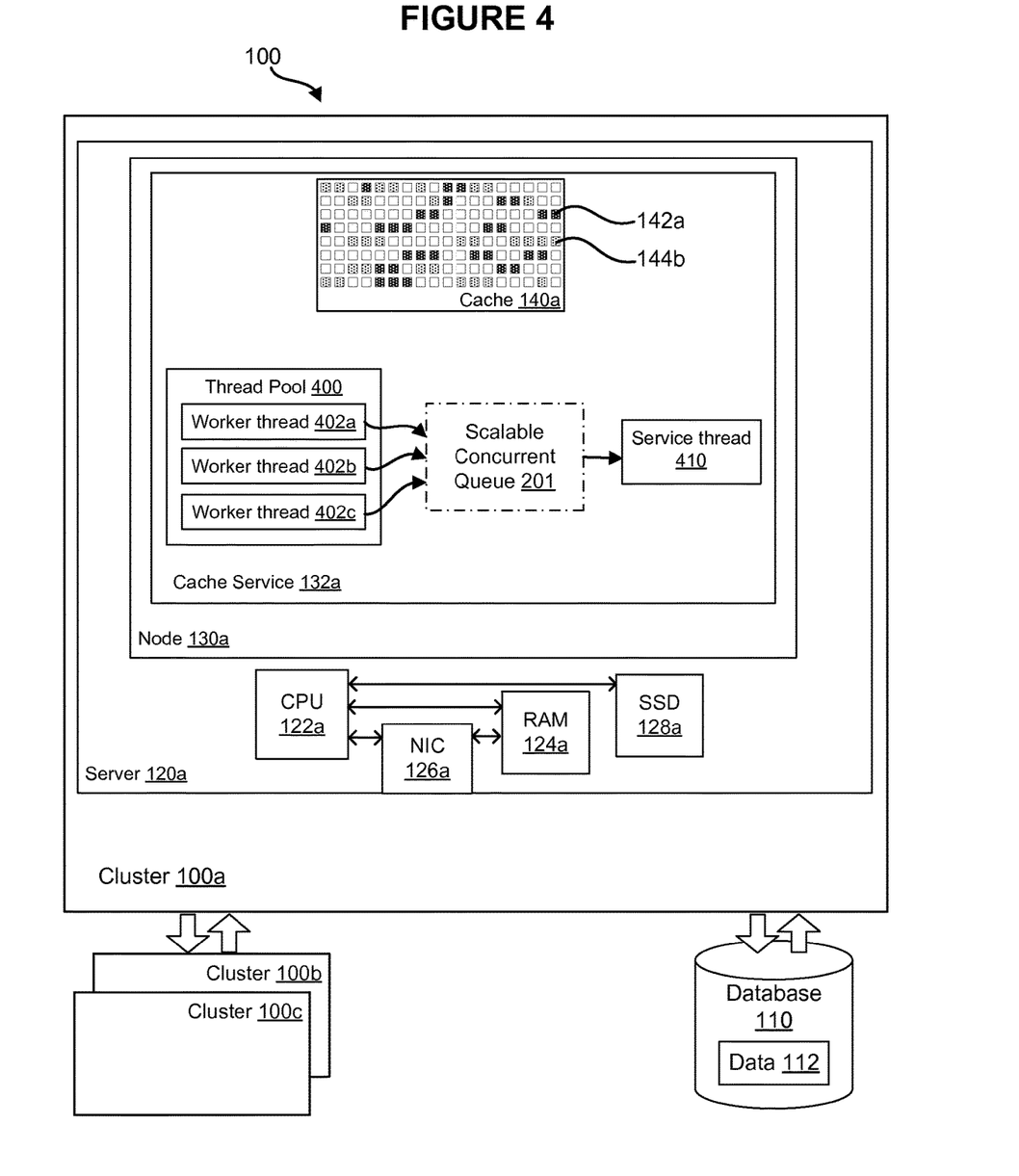
FIG. 4 illustrates implementation of a scalable concurrent in a distributed data grid, in accordance with an embodiment of the invention.

FIG. 4 illustrates implementation of a scalable concurrent in a distributed data grid, in accordance with an embodiment of the invention. As shown, for example, in FIG. 4, a service provided by a node 130a in a distributed data grid 100 can be provided by a service thread 410. The service may be, for example a cache service 132a. To provide extra processing resources, the service thread may work in cooperation with a thread pool 400 comprising a large number of worker threads (three shown) 402a, 402b, 402c. The worker threads can comprise multiple producers and the service thread comprises the single consumer for work performed by the worker threads. A scalable concurrent queue 201 as described above can be used by the large number of worker threads to communicate with the service thread. The scalable concurrent queue enhances operation of a service thread configured with the pool of worker threads in the distributed data grid by reducing contention between the worker threads as compared to use of a conventional queue. The scalable concurrent queue 201 can also be applied to a wide variety of other applications having multiple producers writing to a single queue in the distributed data grid 100 or other computing environments. For example, the scalable concurrent queue is also useful in other systems utilizing a multi-threaded messaging system.

Many features of the present invention can be performed in, using, or with the assistance of hardware, software, firmware, or combinations thereof. The present invention may be conveniently implemented using one or more conventional general purpose or specialized digital computer, computing device, machine, or microprocessor, including one or more processors, memory and/or computer readable storage media programmed according to the teachings of the present disclosure. Features of the invention may also be implemented in hardware using, for example, hardware components such as application specific integrated circuits (ASICs) and programmable logic device. Implementation of the hardware state machine so as to perform the functions described herein will be apparent to persons skilled in the relevant art.

Features of the present invention can be incorporated in software and/or firmware for controlling the hardware of a processing system, and for enabling a processing system to interact with other mechanisms utilizing the results of the present invention. Such software or firmware may include, but is not limited to, application code, device drivers, operating systems and execution environments/containers. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium or computer readable medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. In embodiments, the storage medium or computer readable medium is non-transitory.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A method for providing a scalable queue in a multi-threaded processing environment, the method comprising:
   providing a central queue having a head, a tail, a tail reference, and an ordered plurality of nodes;
   providing a plurality of temporary queues each holding a batch of nodes;
   configuring a plurality of producers to perform an insertion operation to insert a node into said central queue, wherein said insertion operation comprises:
      inserting a node into a batch of nodes in a temporary queue of the plurality of temporary queues,
         wherein a producer that inserts a first node into a batch in a temporary queue is configured as a primary producer for said batch, and a producer that inserts other than the first node into said batch is configured as a secondary producer for said batch;
      attempting to insert said batch of nodes held in said temporary queue into the central queue,
         wherein the primary producer for a batch in a temporary queue is configured to continually attempt to insert the batch into the central queue, and the secondary producer for the batch is configured to only periodically attempt to insert the batch into the central queue; and
      completing said insertion operation when said batch is inserted into the central queue; and
   whereby nodes are inserted into said central queue in batches, thereby reducing contention on said central queue.

2. The method of claim 1,
   wherein each secondary producer is configured to only periodically attempt to insert said batch into the central queue by implementing a delay between batch insertion attempts, the delay corresponding to a size of the batch.

3. The method of claim 1, wherein attempting to insert said batch of nodes held in said temporary queue into the central queue, comprises:
   reading the tail reference of the central queue;
   scanning of said central queue to find the tail;
   determining whether said batch has previously been inserted in said central queue; and
   attempting to insert said batch into the central queue by modifying the tail of the central queue to identify a first node in said batch.

4. The method of claim 1, wherein attempting to insert said batch of nodes held in said temporary queue into the central queue, comprises:
   reading the tail reference of the central queue;
   scanning said central queue to find the tail;
   determining whether said batch has previously been inserted in said central queue; and
   attempting to insert said batch into the central queue by modifying the tail of the central queue to identify a first node in said batch using a compare-and-set operation on a next reference of said tail.

5. The method of claim 1, wherein attempting to insert said batch of nodes held in said temporary queue into the central queue, comprises:
   reading the tail reference of the central queue;
   determining whether said batch has previously been inserted in said central queue, by scanning the central queue for both the tail of the central queue and a batch end of said batch; and
   if said tail is found without finding said batch end of said batch, attempting to insert said batch into the central queue by modifying the tail of the central queue to identify a first node in said batch using a compare-and-set operation on a next reference of said tail.

6. The method of claim 1, wherein said multi-threaded processing environment is a distributed data grid, and wherein said scalable queue serves a service thread of said distributed data grid, wherein said service thread consumes said ordered plurality of nodes from said scalable queue.

7. The method of claim 1, wherein providing a plurality of temporary queues each holding a batch of nodes comprises:
providing at least eight temporary queues.

8. The method of claim 1, wherein providing a plurality of temporary queues each holding a batch of nodes comprises:
determining a CPU count for a system hosting said scalable queue;
providing a number of temporary queues wherein said number is between 90% of said CPU count and 2.

9. The method of claim 1, further comprising:
holding all threads associated with a node of a batch until said batch is inserted in the central queue and then releasing all of said threads.

10. The method of claim 1, further comprising:
creating a new temporary queue to hold a new batch of nodes upon successful insertion of a batch of nodes into the central queue.

11. A system for providing a scalable queue in a multi-threaded processing environment, the system comprising:
a computer system having a memory and microprocessor capable of multi-threaded operation;
a central queue having a head, a tail, a tail reference, and an ordered plurality of nodes in said memory;
a plurality of temporary queues each holding a batch of nodes;
a plurality of producers configured to perform an insertion operation to insert a node into said central queue, wherein said insertion operation comprises:
inserting a node into a batch of nodes in a temporary queue of the plurality of temporary queues,
wherein a producer that inserts a first node into a batch in a temporary queue is configured as a primary producer for said batch, and a producer that inserts other than the first node into said batch is configured as a secondary producer for said batch;
attempting to insert said batch of nodes held in said temporary queue into the central queue,
wherein the primary producer for a batch in a temporary queue is configured to continually attempt to insert the batch into the central queue, and the secondary producer for the batch is configured to only periodically attempt to insert the batch into the central queue; and
completing said insertion operation when said batch is inserted into the central queue; and
whereby nodes are inserted into said central queue in batches, thereby reducing contention on said central queue.

12. The system of claim 11,
wherein each secondary producer is configured to only periodically attempt to insert said batch into the central queue by implementing a delay between batch insertion attempts, the delay corresponding to a size of the batch.

13. The system of claim 11, wherein attempting to insert said batch of nodes held in said temporary queue into the central queue, comprises:
reading the tail reference of the central queue;
scanning of said central queue to find the tail;
determining whether said batch has previously been inserted in said central queue;
attempting to insert said batch into the central queue by modifying the tail of the central queue to identify a first node in said batch.

14. The system of claim 11, wherein attempting to insert said batch of nodes held in said temporary queue into the central queue, comprises:
reading the tail reference of the central queue;
scanning said central queue to find the tail;
determining whether said batch has previously been inserted in said central queue; and
attempting to insert said batch into the central queue by modifying the tail of the central queue to identify a first node in said batch using a compare-and-set operation on a next reference of said tail.

15. The system of claim 11, wherein attempting to insert said batch of nodes held in said temporary queue into the central queue, comprises:
reading the tail reference of the central queue;
determining whether said batch has previously been inserted in said central queue, by scanning the central queue for both the tail of the central queue and a batch end of said batch; and
if said tail is found without finding said batch end of said batch, attempting to insert said batch into the central queue by modifying the tail of the central queue to identify a first node in said batch using a compare-and-set operation on a next reference of said tail.

16. The system of claim 11, wherein said multi-threaded processing environment is a distributed data grid, and wherein said scalable queue serves a service thread of said distributed data grid, wherein said service thread consumes said ordered plurality of nodes from said scalable queue.

17. The system of claim 11, comprises at least eight temporary queues.

18. The system of claim 11, wherein said scalable queue is configured to hold all threads associated with a node of a batch until said batch is inserted in the central queue and then release all of said threads.

19. The system of claim 11, wherein a new temporary queue is created to hold a new batch of nodes upon successful insertion of a batch of nodes into the central queue.

20. A non-transitory computer readable medium including instructions stored thereon for providing a scalable queue in a multi-threaded processing environment, which instructions, when executed, cause the multi-threaded processing environment to perform steps comprising:
providing a central queue having a head, a tail, a tail reference, and an ordered plurality of nodes;
providing a plurality of temporary queues each holding a batch of nodes;
configuring a plurality of producers to perform an insertion operation to insert a node into said central queue, wherein said insertion operation comprises:
inserting a node into a batch of nodes in a temporary queue of the plurality of temporary queues,
wherein a producer that inserts a first node into a batch in a temporary queue is configured as a primary producer for said batch, and a producer that inserts other than the first node into said batch is configured as a secondary producer for said batch;
attempting to insert said batch of nodes held in said temporary queue into the central queue,
wherein the primary producer for a batch in a temporary queue is configured to continually attempt to insert the batch into the central queue, and the secondary producer for the batch is configured to only periodically attempt to insert the batch into the central queue; and completing said insertion operation when said batch is inserted into the central queue; and whereby nodes are inserted into said central queue in batches, thereby reducing contention on said central queue.

\* \* \* \* \*

UNITED STATES PATENT AND TRADEMARK OFFICE
CERTIFICATE OF CORRECTION

PATENT NO.         : 9,672,038 B2
APPLICATION NO.    : 14/856106
DATED              : June 6, 2017
INVENTOR(S)        : Falco It is certified that error appears in the above-identified patent and that said Letters Patent is hereby corrected as shown below:

In Column 9, Line 56, delete "that that" and insert -- that --, therefor.

In Column 14, Line 10, delete "that that" and insert -- that --, therefor.

Signed and Sealed this
Twenty-third Day of January, 2018

Joseph Matal
*Performing the Functions and Duties of the
Under Secretary of Commerce for Intellectual Property and
Director of the United States Patent and Trademark Office*